INVENTOR.
John H. Province

June 23, 1953 J. H. PROVINCE 2,643,093
AIR ACTUATED CONTROL SYSTEM
Filed July 24, 1948 12 Sheets-Sheet 3
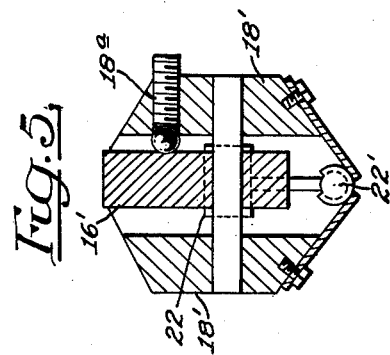
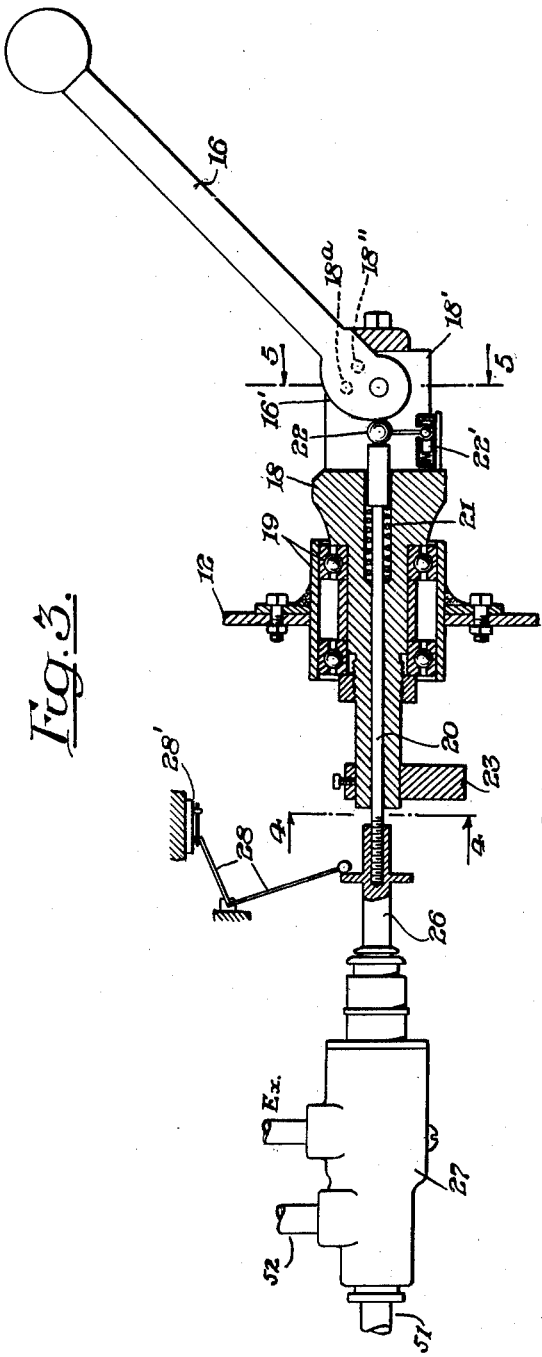
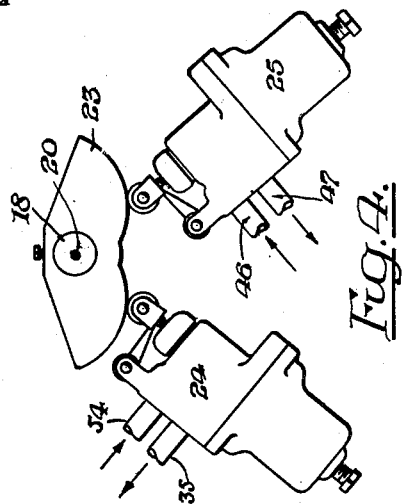
INVENTOR.
John H. Province
BY Darby & Darby
Attorneys

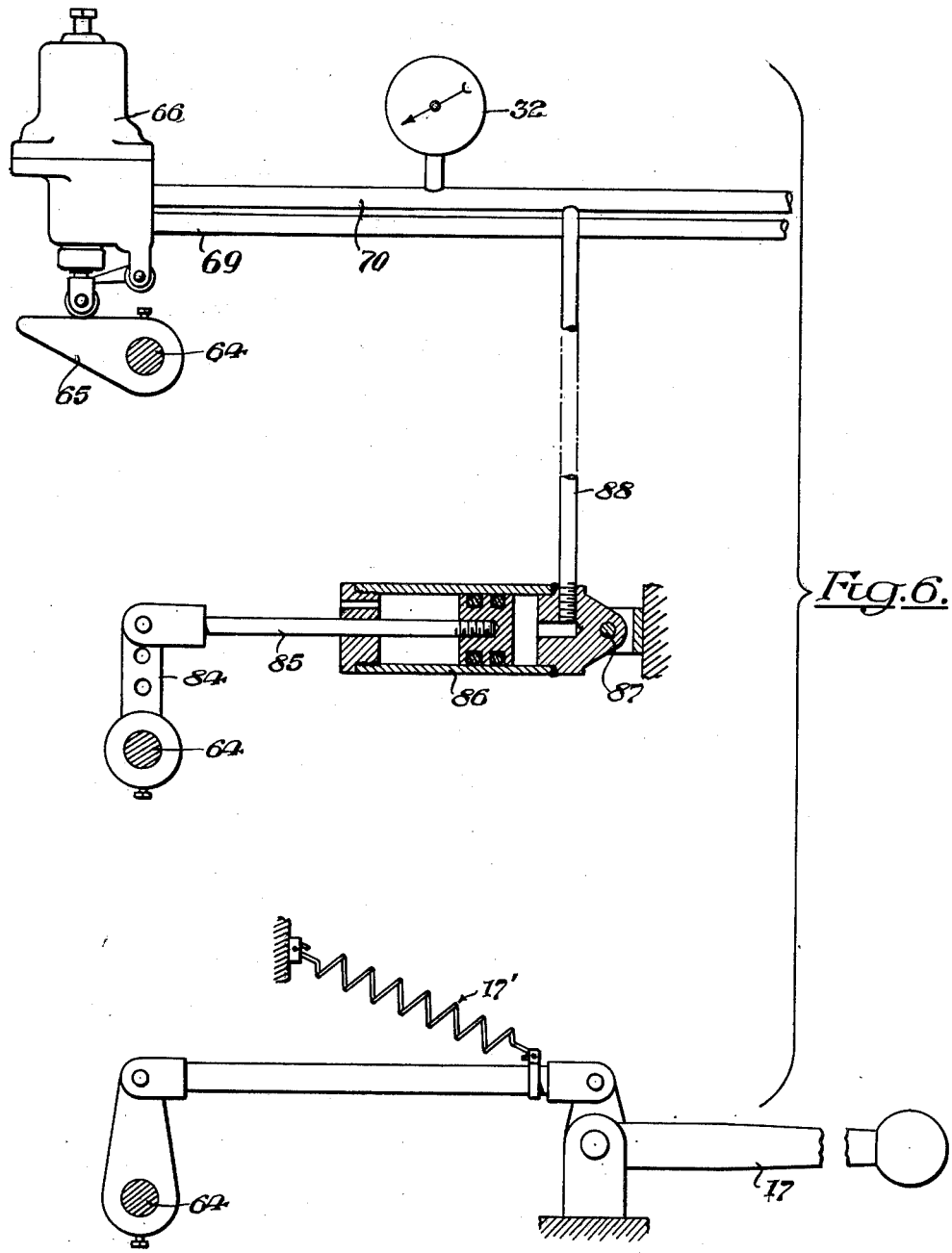

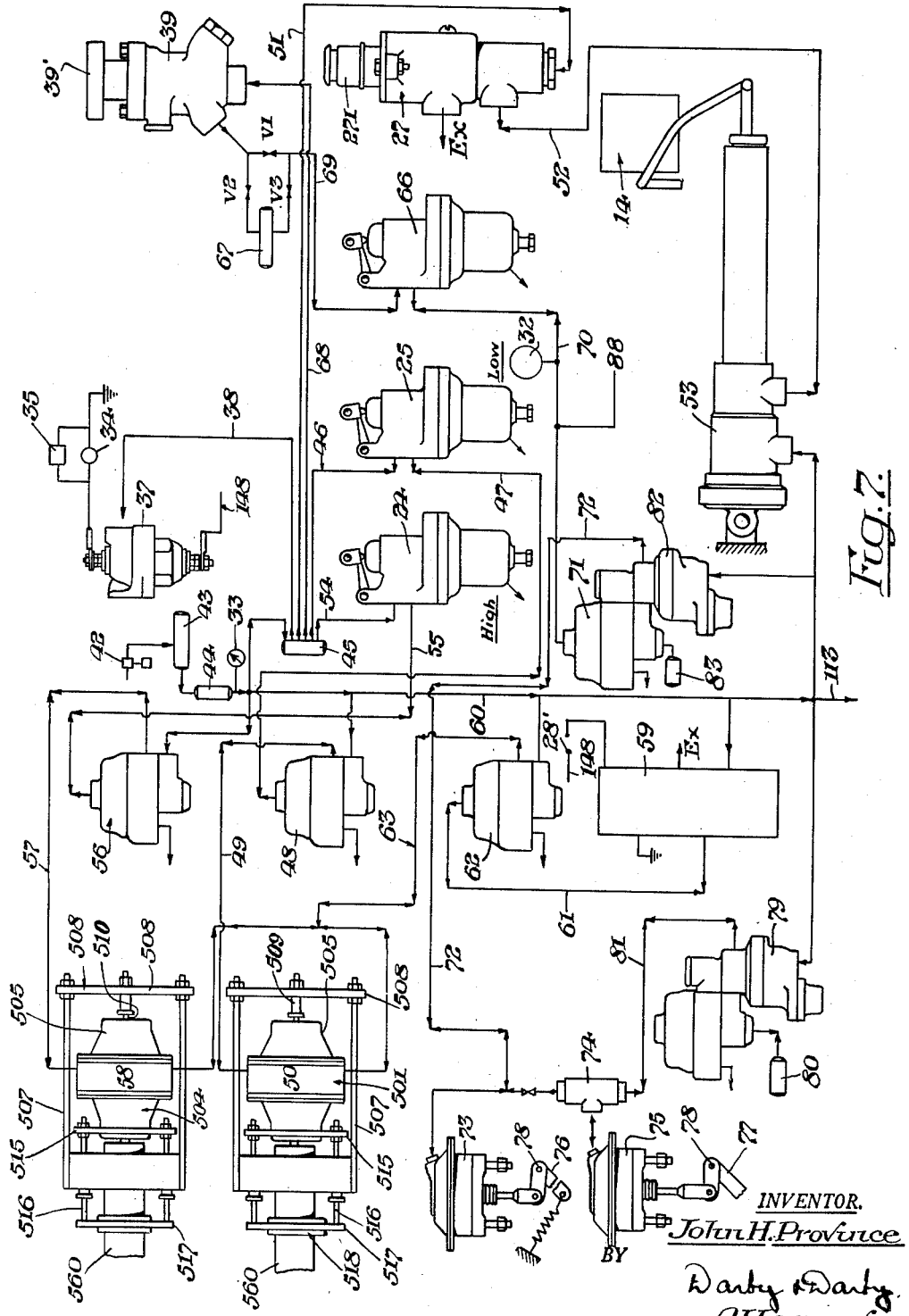

June 23, 1953 J. H. PROVINCE 2,643,093
AIR ACTUATED CONTROL SYSTEM
Filed July 24, 1948 12 Sheets-Sheet 6

INVENTOR.
John H. Province
BY
Darby & Darby
Attorneys

June 23, 1953 J. H. PROVINCE 2,643,093
AIR ACTUATED CONTROL SYSTEM
Filed July 24, 1948 12 Sheets-Sheet 7

INVENTOR.
John H. Province
BY Darby & Darby
Attorneys

June 23, 1953 — J. H. PROVINCE — 2,643,093
AIR ACTUATED CONTROL SYSTEM
Filed July 24, 1948 — 12 Sheets-Sheet 8

INVENTOR.
John H. Province
BY Darby & Darby
Attorneys.

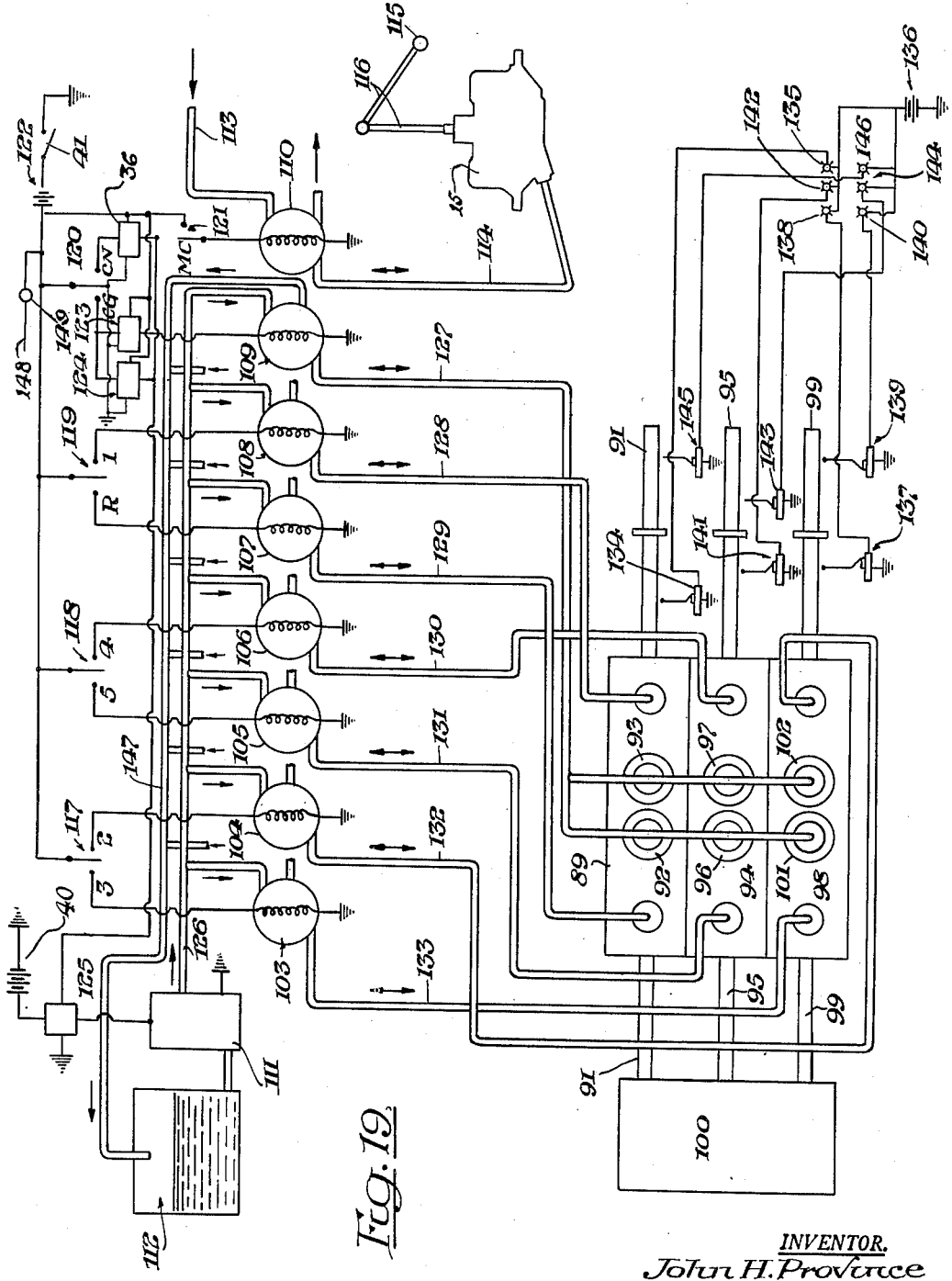

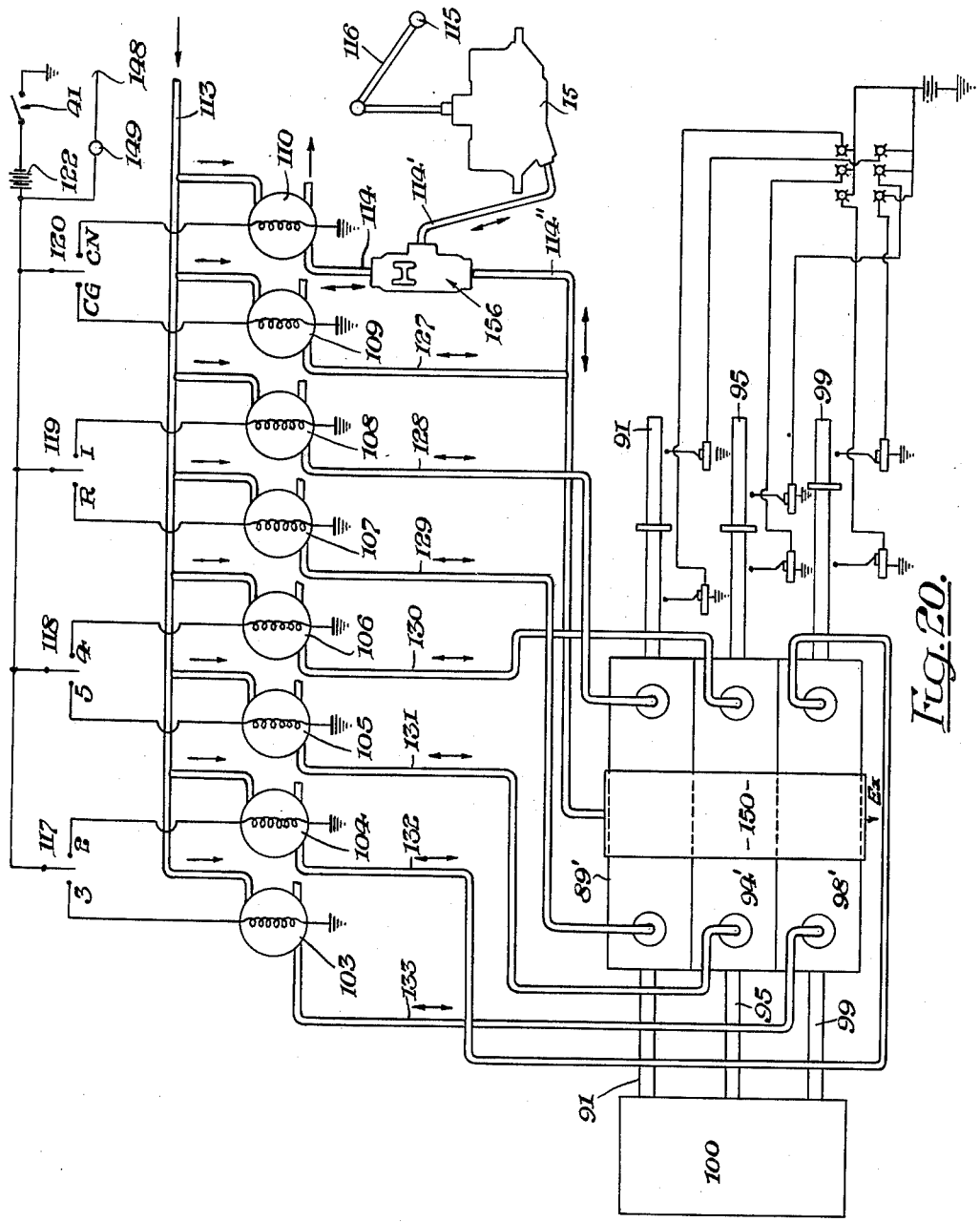

June 23, 1953 J. H. PROVINCE 2,643,093
AIR ACTUATED CONTROL SYSTEM
Filed July 24, 1948 12 Sheets-Sheet 11

INVENTOR.
John H. Province
BY
Darby & Darby.
Attorneys.

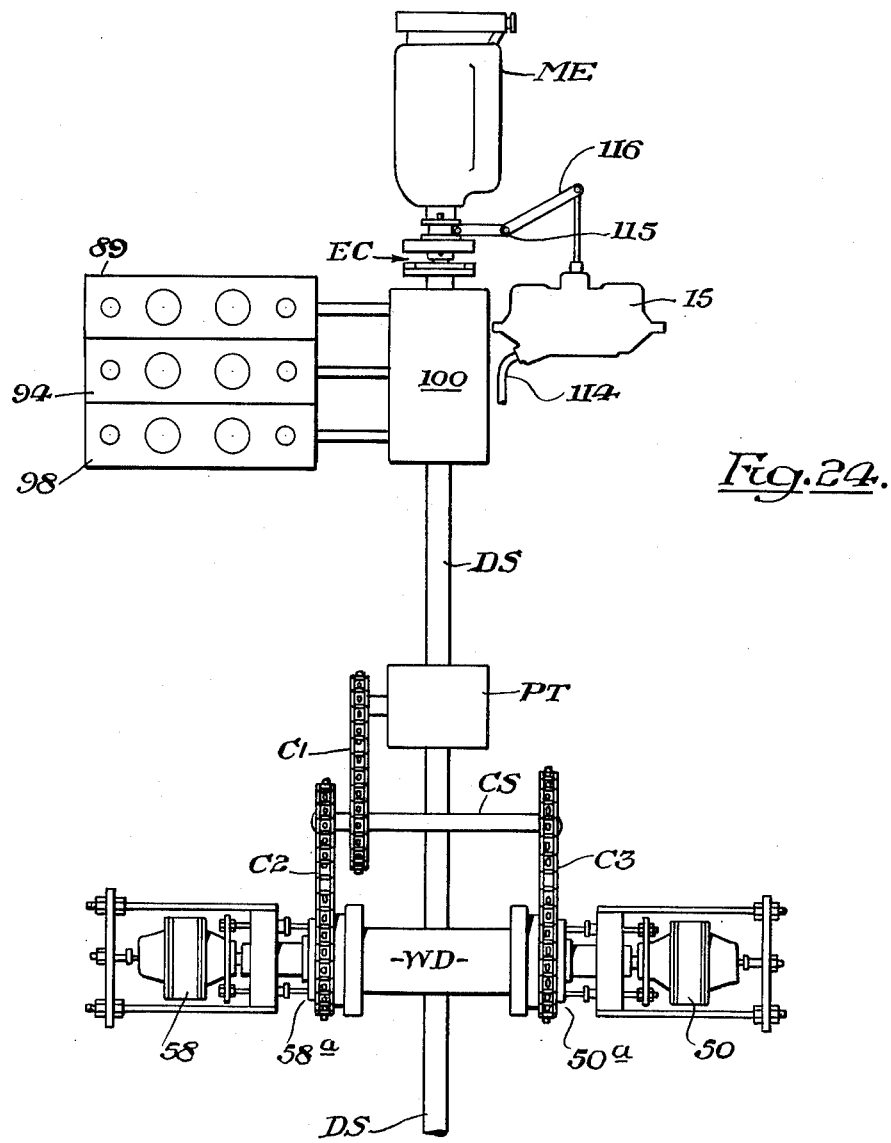

Patented June 23, 1953

2,643,093

UNITED STATES PATENT OFFICE 2,643,093

AIR ACTUATED CONTROL SYSTEM

John H. Province, Oklahoma City, Okla., assignor to Phillips Petroleum Company, a corporation of Delaware Application July 24, 1948, Serial No. 40,587

31 Claims. (Cl. 254—187)

1

This invention comprises a control system adapted to the efficient operation of the pulling and running of sucker rods and tubing used in oil wells.

In servicing an oil well, the pulling and running of sucker rods, pumps and tubing is essentially the same whether it is performed with a pulling unit equipped with a mast or whether the well is equipped with a derrick. The mobile power unit is set in position adjacent the well head and the derrick or mast is "strung" with the conventional traveling blocks, wire lines, links, elevators and the like. Such a unit may be of the type in which the winch drum is driven by the engine which operates the unit or may be of the type in which the winch drum is driven by a separate engine especially provided therefor. However, the servicing operation is essentially the same in using either type of unit. In both instances, the pulling unit operator through suitable transmission and winch clutches operates the winch drum at the fastest possible speed that well load conditions permit.

Let it be assumed now that all necessary equipment has been set up, the well head disconnected, and the string of tubing is ready for pulling. Assume also that the well is to be pulled in doubles (two joints of pipe) and "stood" in the derrick. It is of course understood that the choice of pulling singles, doubles, trebles and so forth and the choice of standing the pipe in the derrick or laying the pipe down usually depends upon the type and height of the derrick or mast. The pulling unit operator starts the engine and selects a certain transmission speed depending on the conditions—low speed if the load is heavy. The pulling crew latches the elevators around the tubing string immediately below the top collar and the unit operator engages the low winch clutch to actuate the winch drum. It is possible that after the load is moving a faster speed can be used to lift the string. If that is possible, the operator then disengages the low winch clutch and simultaneously engages the high winch clutch. When the desired number of joints of pipe have been lifted, the unit operator disengages the winch clutch and sets the brakes. The pulling crew sets the slips around the pipe and breaks the pipe joint. The derrick man then guides the pipe to proper position in the derrick and immediately unlatches the elevators so that they may be lowered to repeat the operation.

In carrying out the above operations, with present equipment, changes of speed and actuation of the high and low winch clutches are effected through mechanical levers. Consequently, the operator must exert considerable physical effort to actuate the various devices controlled by these levers. The unit operator also supervises all pulling operations and therefore must be alert for all happenings. Since his place on the unit near the winch drum is fixed, the operator must stare into the sun part of the time. Also, since the distance from the operator's position to the well is short he must bend his neck to follow the elevators up or down the derrick. These conditions add to the physical strain imposed upon the operator, tending to reduce his efficiency and possibly render him careless. The system comprising this invention is quite flexible with respect to the location of the control point at which the operator is stationed so that all of these undesirable operating conditions from the viewpoint of the operator are eliminated.

It is therefore an object of this invention to reduce the physical exertion imposed upon the unit operator with a resulting loss of efficiency and, hence, time and money, but more important, it is an object of this invention to enable the unit operator to reduce pulling time to a minimum by enabling him to easily and quickly select the fastest engine and transmission speed that load conditions will allow.

Another object of this invention is the provision of a mobile tractor unit provided with an apparatus combination by means of which a well may be pulled and including the various control devices located at a central station by means of which the operator can effect all the usual operations required in pulling a well.

Another object of the invention is to provide a composite control unit which may be placed with respect to the power unit at the most desirable position in relation to the well to insure efficient, safe operation of the mechanism.

Another object of the invention is to provide a manually operated electromagnetic control system for the winch power source by means of which all of the usual operations incident to the pulling of a well may be effected.

A still more specific object of the invention is to provide novel devices to be manually actuated by the unit operator for effecting the desired control of the winch drum, power source and power transmission by means of which the power source is connected to the winch drum for various speeds of operation.

A more specific object of the invention is to provide a selectively actuated electro-pneumatic and/or electro-hydraulic means for interconnecting a power source with its load for various speeds of operation and including a power operated actuator for the winch clutch forming part of such transmission.

Still another object of the invention is to provide in such a combination simple centralized control means manually actuable to effect such selective operation.

A still more specific object of the invention is to provide, in a mobile well pulling unit, in which the traction engine of the unit is employed to operate the winch drum, selectively actuable pneumatic and/or hydraulic operators for the engine clutch and transmission of the engine controllable from a remote point which may be changed as conditions desire to effect operation of the winch drum and also controllable from the cab of the unit when the engine is used to propel the unit.

Still another object of the invention is to provide an automatically operating signalling system for indicating at the control point the operating condition of the transmission at all times.

A still more specific object of the invention is to provide a manually controlled actuator at the remote control point for adjusting the carburetor to control the engine speed.

Another object of the invention is to provide a novel form of control unit positionable with respect to the mobile unit and including novel forms of actuating mechanism for the devices controlled thereby.

Other and more detailed objects of the invention will be apparent from the following description of the embodiment of the invention illustrated in the attached drawings.

This invention resides substantially in the combination, construction, arrangement and relative location of parts, all as will be hereinafter described.

In the accompanying drawings—

Figure 3 is a view partly in elevation and partly in longitudinal cross section showing the winch clutch and accelerator control manual and associated mechanism;

Figure 4 is a cross sectional view taken on the line 4—4 of Figure 3;

Figure 5 is a cross sectional view taken on the line 5—5 of Figure 3 with the lever removed;

Figure 6 is a view partly in elevation and partly in cross section with some parts broken away showing the manual and associated mechanism by means of which the winch drum brakes are controlled;

Figure 7 is a schematic view of the entire control system including the accelerator actuators, the brake drum actuators and the winch clutch actuators;

Figure 19 is a diagrammatic and schematic plan view of the gear shift actuators and engine clutch actuator and the control system therefor;

Figure 20 is a similar view of a modified arrangement;

Figure 24 is a diagrammatic illustration showing the vehicle engine and drive shaft, the main engine clutch, a power actuated gear shift, the power take-off and the winch drum driven therefrom together with the pressure fluid operated motors for the winch drum clutches.

Figure 1:
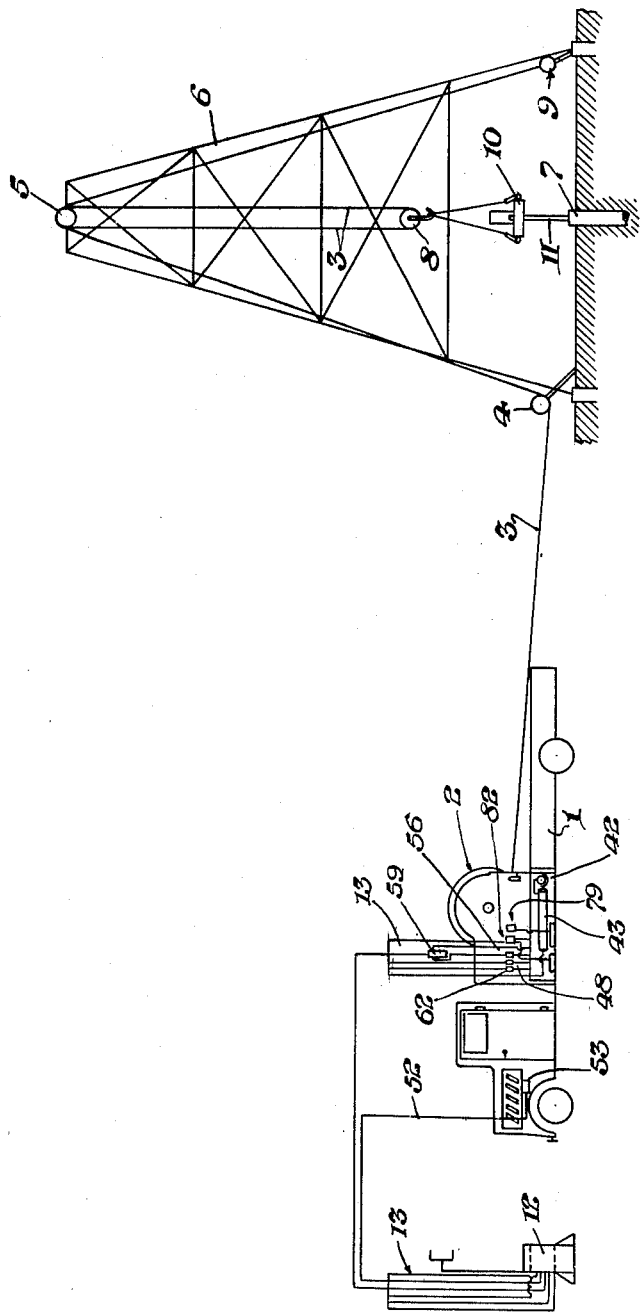
Figure 1 is a diagrammatic and schematic illustration of the mobile unit and the control unit in one possible spatial disposition with respect to the well and derrick.

The nature, scope, details and operation of the system of this invention will be best appreciated after a detailed description of all of the elements composing the system. Referring to Figure 1, the mobile power unit is illustrated at 1 as comprising an engine driven vehicle or tractor of any form suited to the purpose. Mounted thereon is a winch drum 2 diagrammatically illustrated on which the line 3 is reeled. From this drum, the line 3 extends around a suitably located holddown 4 and from there it passes to the crown pulley 5 mounted at the top of the derrick 6. From there it passes to the traveling blocks 8 and as is well understood in the art, the line 3 may pass back and forth between the crown pulley 5 and the traveling block 8 several times before it passes to the anchor 9. Thus, as the line 3 is reeled and unreeled, the traveling block 8 travels up and down in the derrick. The traveling block 8 supports by suitable links the elevators 10 by means of which connection is made to the string 11 to be pulled from the well casing 7, all as will be understood by those skilled in the art. At 12 is diagrammatically illustrated the control box from which extends a bundle of wires and flexible hoses 13 to the various devices controlled thereby and mounted on the chassis of the tractor.

The control unit 12 is illustrated in detail in Figures 2 to 6, inclusive, and comprises a suitable box or housing of which the top wall forms a control and indicating panel 12a. The various electric cables 13" and air tubing 13 and 13' extend from one side of this housing and on the opposite side are the winch clutch manual 16 and the brake manual 17. Manual 16 comprises a lever pivotally mounted between a pair of arms 18' forming an extension of a fixture 18 which is rotatably mounted in a suitable bearing 19 detachably secured to the side of housing 12.

The pivoted end of lever 16 has a cam shaped formation 16' for cooperation with a roller contact 22 which is mounted on a spring loaded swivel support 22' as clearly shown in Figure 3. Roller 22 is interposed between the cam 16' and the adjacent end of a shaft 20 which is slidably mounted in a central bore in the fixture 18 and biased by means of a spring 21 to hold the contact roller 22 between it and the cam 16'. The fixture 18 has a cylindrical extension to which is adjustably attached a cam 23 for actuating the control valves 24 and 25. Shaft 20 extends exteriorly of the fixture 18 as shown and has threadedly mounted thereon a flanged contact piece 26 arranged to engage an operating plunger for the throttling valve 27. A bell crank lever 28 pivotally mounted on a fixed support is arranged to be engaged at one end by the flange of the contact piece 26 and also arranged to actuate a microswitch 28' which controls the simultaneous release of both the high and low winch clutches as will be explained later. In order to give the operator an indication that in positioning the lever 16 he is approaching the point of actuation of microswitch 28' a spring loaded ball detent 18a is positioned to engage a depression 18'' in the side face of cam 16'.

Returning to Figure 2, brief reference will be made to some of the elements on the control panel 12a. At 29 and 30 are ignition and starter switches for the tractor engine by means of which the operator can start and stop the engine as he desires. No further reference will be made to them. At 31 is the engine speed indicator which may be a conventional tachometer. At 33 is the air pressure gage for the main air reservoir and at 32 is an air pressure indicator for the brake controls. An indicator light 34 is provided to give warning when the main air pressure falls below a safe value. A signal lamp 149 is in the main power supply circuit to indicate when that circuit is operative. The remaining switches and indicator lights can best be referred to in connection with the description of Figures 7, 19 and 20.

With reference to Figure 6, the brake manual 17 is in the form of a pivotally supported bell crank lever which is connected by a link biased by a spring 17' to a lever secured to a shaft 64. A lever 84 also secured to this shaft is pivotally connected to the piston rod 85 of a piston operating in a cylinder 86 pivotally supported at 87 and supplied with air from the air brake line 70 through a branch 88. It will be seen that the actuation of shaft 64 by means of the brake lever 17 is in opposition to the reaction afforded by the air pressure in cylinder 86 in the direction to operate valve 66 by means of cam 65 also attached to the shaft 64. The provision of this feeler serves to give the operator a better control of valve 66 from lever 17.

Figure 8:
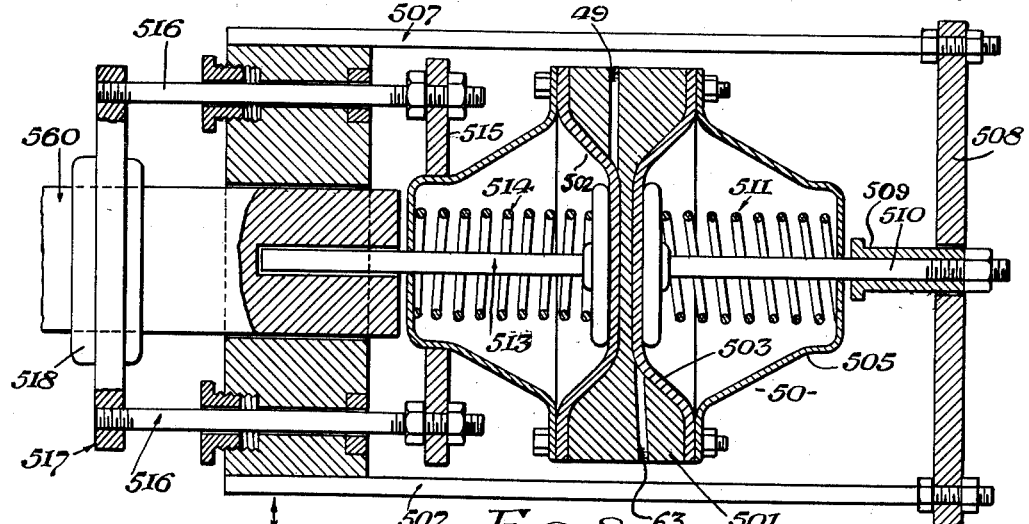
Figure 8 is a longitudinal vertical central cross sectional view through one of the winch clutch actuators.
Figure 9:
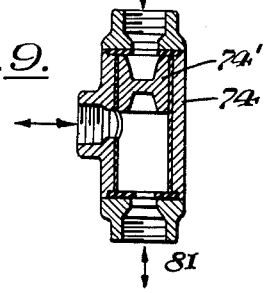
Figure 9 is a vertical central cross sectional view through a three-way check valve used in the system.
Figure 10:
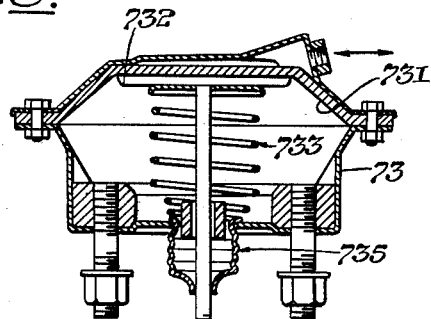
Figure 10 is a vertical central cross sectional view through one of the brake actuators showing the associated linkage. A similar actuator is employed to operate the engine clutch.

The low and high winch clutch actuators 50 and 56, the former of which is illustrated in detail in Figure 8, form the subject matter of my copending application, Serial No. 768,566, filed August 14, 1947. They are disclosed in sufficient detail in Figure 8 to understand their operation in this system. A separate detailed description thereof is not deemed necessary since reference to Figure 8 will be made in describing the operation of the complete system. Similarly, no detailed reference at this point will be made to the features of construction of the devices illustrated in full detail in Figures 9 to 18, inclusive, because each is a commercial form of device readily available and well understood by those skilled in the art. Indeed, it will appear from a full understanding of this disclosure that in many cases these various devices may take other specific detailed forms and as they are available commercially in various forms it is the intent here not to limit the scope of the invention to the particular details of these various devices.

The assemblage of Figure 7 will now be described. An air compressor 42 which may be driven either by the tractor engine or a separate engine provided therefor stores air in the main reservoir 43. The diagrammatic illustration of the compressor 42 is intended to include the practical condition that several such compressors may be employed as a safety factor for maintaining full reservoir pressure in the tank 43. Air is delivered from the reservoir 43 through a suitable filter and scrubber 44 to the main supply line 60 which is provided with a number of branches as will be explained including a branch to the volume or surge tank 45 from which various subsidiary connections are made. As indicated in Figure 7, the line 60 is in direct communication with the line from the scrubber 44, to the tank 45. From the tank 45 a line 38 extends to the fluid pressure operated warning switch 37, the construction of a suitable form of which is clearly shown in Figure 18. This switch includes a pair of contacts 371, one of which is fixed and the other of which is mounted upon a flexible diaphragm influenced by the air pressure supplied through the line 38. The fixed contact is connected to ground through the warning light 34 and the audible signal such as the buzzer 35. It will be seen that should the pressure in line 38 fall below a predetermined value as set by the spring loading on the diaphragm, contacts 371 will engage to complete a circuit from the power supply line 148 or battery 122 to ground through these signal devices.

Figure 2:
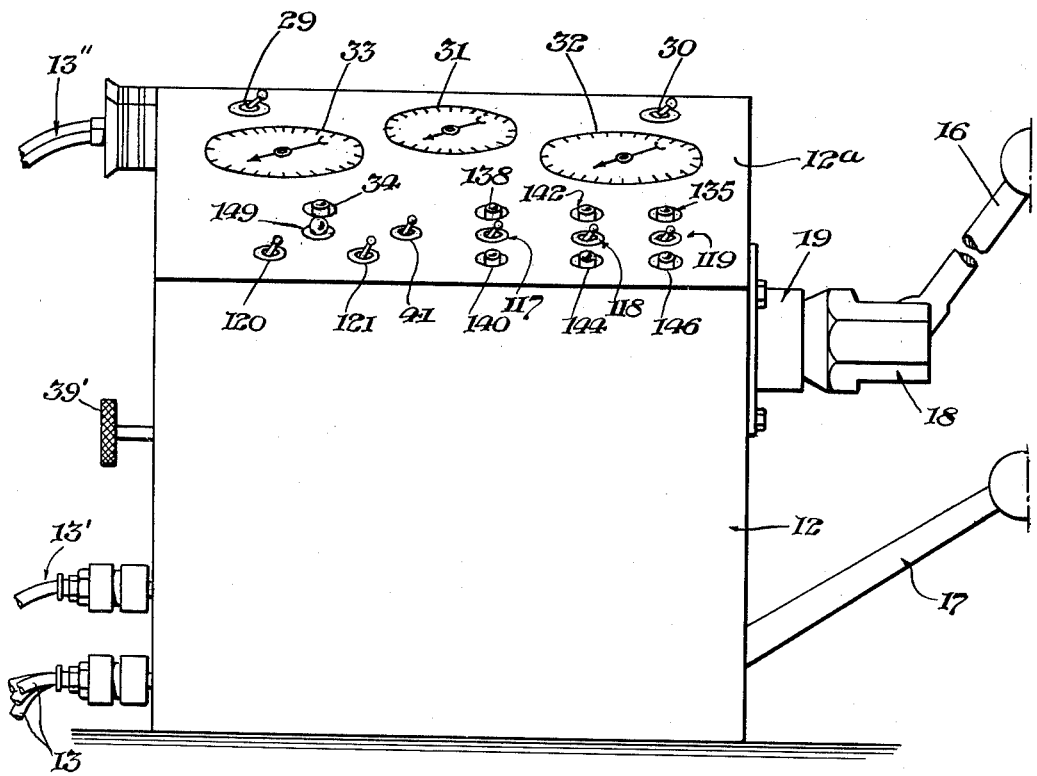
Figure 2 is a front elevational view of the control unit showing the various indicators, manually actuable levers and switches for effecting the full operation of the system.

A line 68 extends from the tank 45 to the pressure limiting valve 39 which has a manual 39' for adjusting the pressure supplied to a second volume tank 67. Figure 2 shows that the limiting valve 39 is mounted in the control box 12 with the manual 39' extending exteriorly thereof for access.

Figure 13:
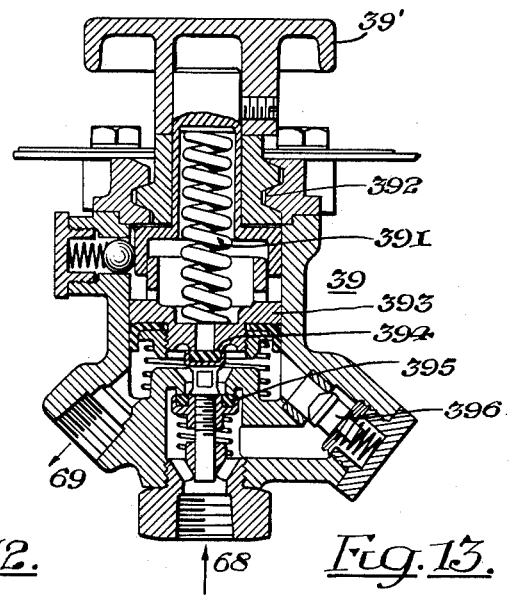
Figure 13 is a vertical central cross sectional view of a pressure limiting valve as used in the system.

The construction of the pressure limiting valve is shown in full detail in Figure 13. Air under pressure from tank 45 as previously stated is supplied to the bottom of this valve through the line 68 as diagrammatically illustrated. The air is trapped in the chamber at the bottom of the valve and flows around valve 395 to the port to which the line 69 is connected. Valve 395 is unseated by the proper adjustment of the manual 39' acting on the graduating spring 391 which bears down upon a piston 393. The loading on the spring is varied by means of the threads 392 connected to manual 39' and coacting with the threads on the valve housing. Piston 393 engages a valve 394 comprising a seat on piston 393 and a valve disc on an extension of the valve 395 to unseat valve 395 in the desired manner thereby allowing air to pass from 68 to 69. The amount that valve 396 is opened thus depends upon the loading provided by the graduating spring 391. Should the pressure in line 69 become sufficiently high piston 393 will be forced upwardly compressing spring 391 with the result that valve 395 which is spring biased to closed position will close. Should the pressure in 68 fall sufficiently below the pressure in 69 while valve 395 remains closed normally spring closed valve 396 will open allowing flow back into line 68. It will be noted from Figure 7 that the line 69 from the valve 39 to tank 67 is provided with valved branches. In normal operation valve V1 is closed and valves V2 and V3 are open so that tanks 45 and 67 are in series in the line 69. If for any reason it is desired to cut tank 67 out of the circuit valve V1 is opened and valves V2 and V3 are closed. As previously mentioned and as shown in Figures 6 and 7, the branch line 88 for the feeler is taken off of line 70.

Figure 15:
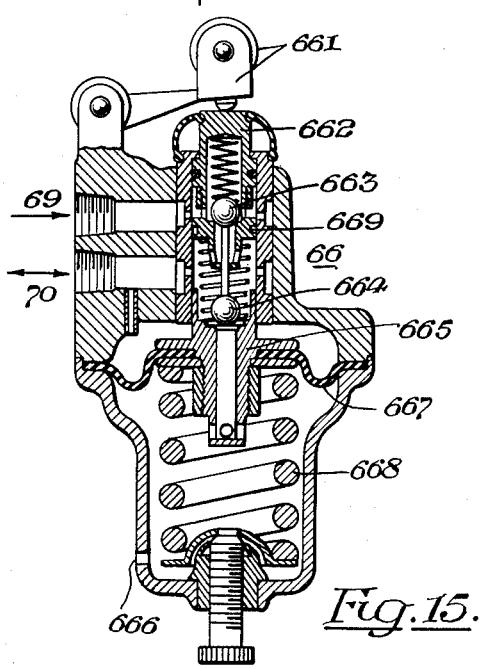
Figure 15 is a vertical central cross sectional view through the brake manual actuated control valve. A similar valve is used to control the clutch actuators.
Figure 18:
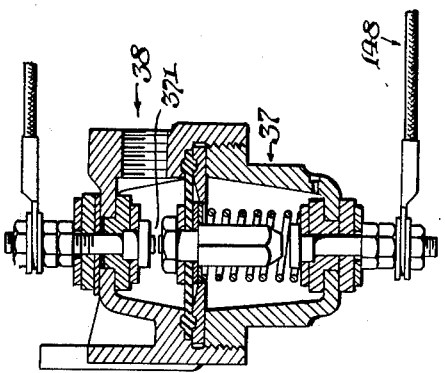
Figure 18 is a vertical central cross sectional view through a pressure actuated switch used in the system.

Line 69 extends to the brake control valve 66 which is exactly like the valves 24 and 25, of which valve 66 is shown in detail in Figure 15. An actuator 661 pivotally mounted on the valve body is positioned to operate a plunger 662 which contains a spring loaded normally closed ball valve 663 and a normally open ball valve 664. A ported member 665 providing a seat for the valve 664 is mounted on a flexible diaphragm 667 sealed in the valve body and loaded by means of an adjustable loading spring 668. The valve housing has a venting port 666 as shown. Air under pressure from tank 67 is supplied through the line 69 into the upper part of the body of valve 66 so as to act on a piston 669 which provides the seat for valve 663. When lever 661 is depressed it carries plunger 662 with it and the ball assemblage 663—664 until the latter engages the seat on the ported member 665. Further downward movement on plunger 662 unseats the ball valve 663 so that air under pressure flows through a passage in piston 669 and from there to pipe 70 connected to the valve body. Thus, upon actuation of valve 66 line 69 is connected to line 70 and pressurized air supplied to the emergency relay valve 71—82 to actuate it. When this relay control valve is returned to normal position as it does when plunger 662 is released back to normal position, air is exhausted back through line 70 and downwardly through valve 664 which is now open through the passage in ported member 665 to the atmosphere at port 666.

Figure 11:
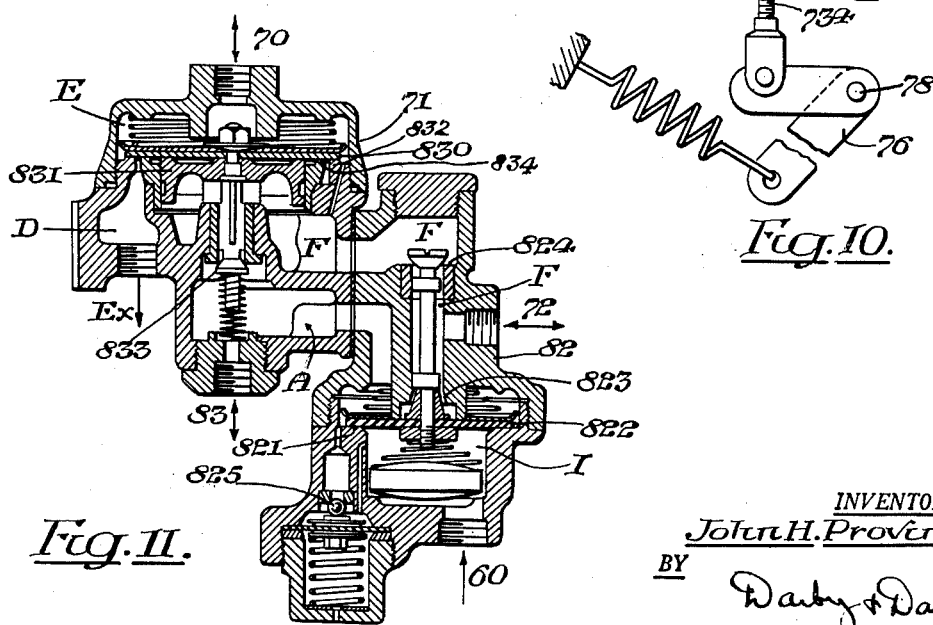
Figure 11 is a vertical central cross sectional view through the emergency relay valve.
Figure 12:
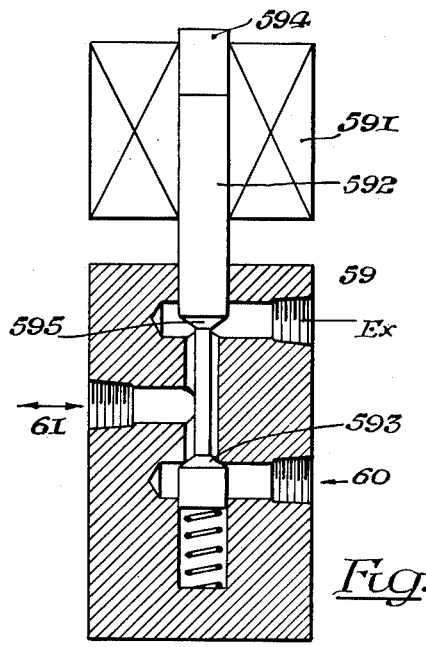
Figure 12 is a vertical central cross sectional view through a suitable form of electromagnetic valve as used in the system.

Referring now to Figure 11, the supply of air under pressure through the line 70 to relay valve 71—82 pressurizes chamber E, forcing the diaphragm 830 at its central portion downwardly, carrying with it the diaphragm guide 831. The diaphragm guide supports the diaphragm within the periphery so that it can flex downwardly at the center while the peripheral edge of the diaphragm remains in seating engagement with the seat 832. Depression of the guide 831 in this manner causes valve 833 to open, supplying air from the tank 83, see Figure 7, around that valve into chamber F and from chamber F through valve 824 which, under these conditions, is open to line 72 through which the air flows to the brake motors 73 and 75, the piston 74' of check valve 74 moving downwardly to permit this. In the case of brake motor 73, Figure 10 for example, air is applied to the upper surface of diaphragm 731 forcing piston rod 734 downwardly against spring 733 to actuate the linkage system 76 on its pivot 78. The flexible boot 735 is employed as usual to keep dirt out of the motor housing. Disc 732 provides an abutment to take the pressure of spring 733 on the diaphragm. Line 60 connects to chamber I of the relay valve raising the peripheral edge 822 of the diaphragm which closes the upper end of this chamber off the seat 821 so that air may flow into chamber A and from thence to the storage tank 83. Thus, normally the air pressure in tank 83 is the same as in line 60. Pressure on this diaphragm normally holds valve 823 closed and valve 824 open. Should the air pressure in the main line 60 fail, pressure in chamber I will drop so that valve 823 opens and valve 824 closes. Under these emergency conditions air under pressure will be supplied to chamber A through valve 823 to line 72 to again actuate the brake motors 73 and 75 and apply the winch drum brakes. If the pressure in chamber A goes too high valve 825 will open connecting chamber A with chamber I and permitting the excess air to fall to a pressure differential between chambers A and I determined by the valve 825. Energizing of the brake motors 73 and 75 cause rotation of the brake actuating shaft 78 to which each is respectively connected by the spring bias linkage systems 76 and 77, the springs being connected to the shaft 78 to release the brakes when the motors are deenergized. When the brakes are to be released valve 66 is closed, cutting off the supply of air through line 70 to the relay valve 71—82 which returns to normal position as shown in Figure 11. The brake engines 73 and 75 then exhaust back through line 72 up through valve 824 and into chamber F. The pressure of this air in chamber F causes the center of diaphragm 830 to rise (guide 831 being a spider) so that the air can escape around valve seat 834 into chamber D and from there to exhaust, the extreme outer periphery of disc 830 being retained on its seat 832. It will be recalled that air for actuating relay 71 is exhausted through line 70 and valve 66 as previously explained in connection with Figure 15.

It will be recalled by referring to Figure 6 that valve 66 is actuated by means of the brake manual 17 upon actuation in the proper direction to move cam 65 so as to depress the plunger of valve 66. Thus the operator by manipulation of lever 17 can apply and release the winch drum brakes as required.

To take care of additional emergency conditions, air for operating the brake motor 75 may be supplied direct from an auxiliary tank 80 through a relay assembly 79 exactly the same in construction as the relay assembly 71—82 but relay 79 is not operated by the supply of air to the top of diaphragm 830, see Figure 11, as previously explained. In describing the operation of relay 79, the reference characters of Figure 11 will be used to save duplicating Figure 11 in the drawings, since relay 79 is exactly the same in construction as relay 71—82 except that the topmost port is sealed off. Under normal conditions reservoir 80 will be maintained at pressure by air from the line 60 which will flow into chamber I raising the periphery of diaphragm 822 so as to flow around it into chamber A and thence to the tank 80. Should the pressure in line 60 fall to too low a value for operation of brake engine 75 in the normal manner air will automatically flow from the tank 80 into chamber A through valve 823 which is open under these conditions (valve 824 is closed) to line 81, to check valve 74 and thence to the motor 75. The supply of air to check valve 74 through line 81 will cause the piston of the valve to move to the position shown in Figure 9 so that air will be supplied to brake engine 75 only. Thus, there is always assured the application of the winch drum brakes by one of the brake motors upon failure of the main air supply system, or the failure of either line 81 or 72.

By reference to Figure 6, it will be recalled that the brake control lever 17 is provided with an air cushioning device by means of which the operator can sense the effectiveness of the brake control, thereby preventing too sudden application of the brakes. The valve 66 being a throttling valve the operator has some control over the rate of application of the brakes and the pressure sensing device 86 prevents too sudden operation of the lever 17, thereby assuring a smoother application of the brakes.

Before describing the operation of the low and high clutches, reference will be made to Figure 24 which diagrammatically shows the manner in which power is supplied for driving the winch drum WD. The vehicle engine by means of which the vehicle is moved about and from which the power is obtained for operating the winch drum is shown at ME. It supplies power for the main drive shaft DS through the clutch EC. This clutch is operated by a motor device 15 which actuates a shaft 115 to which the clutch actuating yoke is attached as will again be referred to hereinafter. Connected in the main drive shaft is the gear box 100 which as described later may include, for example, ratios of five forward speeds and reverse. These gears are shifted to desired ratios by means of pressure fluid operated engines 89, 94 and 98 which will be described in detail later. Also connected to the drive shaft DS is a power take-off mechanism PT of any suitable construction by means of which a chain drive C1 is operated. This chain drive in turn operates a counter-shaft CS which in turn operates a pair of chain drives C2 and C3 for the winch drum WD. These power drives include the low and high clutches 50a and 58a which are actuated, respectively, by the pressure fluid motors 50 and 58.

A description of the operation of the low and high clutches 50a and 58a, see Figs. 7 and 24, by means of which the winch drum WD is connected to the power source may be effective and will be given after a description of the mechanism for automatically maintaining the low and high clutches disengaged. When the winch clutch lever 16 is in the position as shown in Figure 3, microswitch 28' is closed. Referring to Figure 7, it will be seen that this causes energization of the winding 591, see Figure 12, of magnet valve 59, causing valve 593 to open and valve 595 to close, energization of winding 591 causing the attraction of the magnetizable end 594 of plunger 592. As a result the pipe 60 is connected to pipe 61, supplying air to the relay valve 62 which is exactly the same as relay valve 71 previously described or valve 48 described in Figure 17. Actuation of relay valve 62 causes line 60 to be connected to line 63 supplying pressure fluid behind diaphragm 503 of motor 50 and the corresponding diaphragm of motor 58, it being mentioned that both of these motors are exactly the same in construction. It must be realized that the body 501 of the motor has assumed a centered position to the right of the position shown in Figure 8 which is the position to which it would have been actuated when the clutch 50a was engaged. However, the flange of collar 509 at the time the clutch 50a was engaged was left approximately in contact with abutment 508 and the cover 505 which forms part of the body 501 is approximately in contact with the flange of sleeve 509. Thus, when air is introduced behind the diaphragm 503 from pipe 60 the body 501 of the motor will shift to the left, carrying the connected yokes 515 and 517 with it, and, of course, the clutch shifting collar 518 with the result that the clutch 50a connected to that motor is disengaged. In quite the same way had it been that the clutch 58a connected to motor 58 was engaged at the time lever 16 took the position shown in Figure 3 air would similarly have been supplied to it to disengage this clutch. In other words, every time the lever 16 is returned to the position shown in Figure 3 solenoid 59 is energized to disengage whichever one of the two clutches has previously been engaged.

Thus, starting from this position in order to engage the low clutch 50a the operator first rotates the lever 16 to the left, Figure 3, until the ball detent 18a disengages, which operation the operator can recognize by sense of touch. At this time microswitch 28' opens by reason of the movement of the flange on the contact piece 26 to the left. It follows therefore that the solenoid 59 is deenergized, closing valve 59 so as to disconnect pipe 60 from pipe 61 and connect pipe 61 to exhaust through valve 59 which is now open. As a result, relay 62 returns to normal position, disconnecting pipe 63 from supply line 60 and connecting pipe 63 to exhaust thereby exhausting the cavity behind diaphragm 503 whereupon compressed spring 511 returns the diaphragm to the position shown in Figure 8.

As will appear from the description as it proceeds the winch drum clutches 50a and 58a are to be distinguished from the main engine clutch EC through which the engine transmission is driven and from which in turn the shaft to which the winch drum is clutched by either the clutch 50a or 58a is driven. The low and high clutches 50a and 58a are controlled by the winch clutch lever 16 on the control box 12 by oscillating that lever about the axis of the bearing 19.

When lever 16 is pulled towards the operator, that is, upwardly out of the plane of the paper, Figure 3, cam 23 which is connected to the fixture 18, actuates the control valve 25 to supply air from tank 45 through line 46 to line 47. The operation of valve 25 is exactly the same as the operation previously described for valve 66. Thus, air is supplied through line 47 to the relay valve 48, actuating it to connect high pressure air from line 60 to line 49 and thence to the clutch motor 50. The operation of the relay 48 will be clear by reference to Figure 17. When air is supplied through the line 47 to chamber E the center of diaphragm 481 is depressed, moving the diaphragm guide 482 downwardly so as to open valve 483. Exhaust valve 484 will remain closed as in the previous description of relay 71. Air is then supplied from the line 60 to chamber A through open valve 483 to chamber F and thence through line 49 to the motor 50. At this point it may be mentioned that when the motor 50 is exhausted air will flow back through line 49, around spider guide 482 to raise the diaphragm 481 from its seat adjacent the ports 488 to chamber D so that the air may pass to exhaust therethrough. The operation of motor 50 will be described in connection with Figure 8. When air is supplied behind the diaphragm 502 from pipe 49 the piston rod 513 moves a short distance to the left compressing spring 514 until it engages the bottom of the recess in the shaft 560 and the body 501 of the engine moves to the right carrying with it yokes 515 and 517 which are connected together by the rods 516. The movement of these yokes carries the clutch shifting collar 518 with them causing the low clutch 50a actuated thereby to engage. As the clutch is engaged the body 501 of the motor continues its movement to the right carrying with it the flanged sleeve 509 which is mounted on the piston rod 510 until the end flange of the sleeve engages the abutment 508 which is fixed to the stationary support 506 by means of the rods 507. When the flange of sleeve 509 engages the abutment 508 the movement of the motor body 501 stops. The operator may then recenter the lever 16 permitting valve 25 to return to normal position as shown in Figure 15, thereby exhausting air from the space behind diaphragm 502 to atmosphere through the valve body as previously explained. As soon as the air pressure behind diaphragm 502 is exhausted, compressed springs 514 and 511 will return the engine body 501 to a centered position where the loads for these springs are balanced. However, this centering of the engine does not disturb the position of the clutch actuating collar 518 and the parts connected thereto because the form of winch drum clutch 50a with this type of engine is of the overcentered type so that it remains in actuated position after each operation.

In order to disengage the low clutch 50a, the operator merely returns lever 16 to the position shown in Figure 3 whereupon spring 21 returns the plunger 20 to the right, carrying contact piece 26 with it, which in turn closes miscroswitch 28' to cause the low clutch 50a to disengage as previously described.

Figure 14:
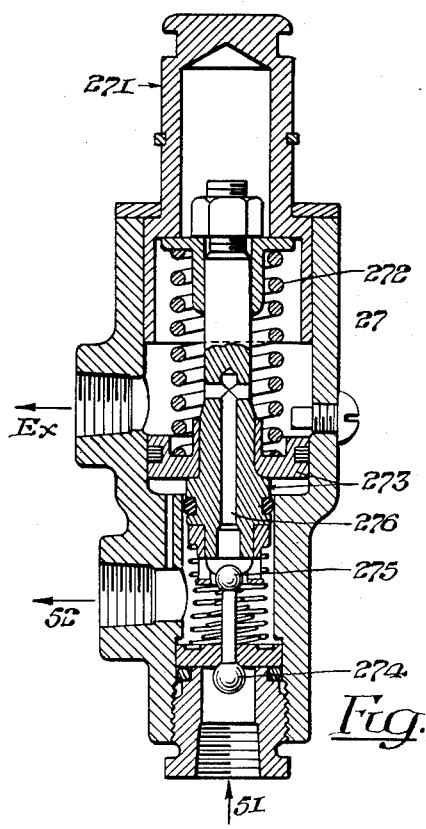
Figure 14 is a vertical central cross sectional view of the throttling valve actuated by the winch clutch manual.

However, with the low clutch engaged, the operator may speed the engine ME, see Fig. 24, up by further rotating lever 16 to the left, Figure 3, causing the contact piece 26 to actuate the throttling valve 27 to connect line 51 to line 52. The throttling valve 27 shown in Figure 14 is actuated by moving head 271 downward. This compresses spring 272 which moves piston 273 and associated parts to a position so that valve 275 closes the port 276 and valve 274 is unseated. Thus, pipe 51 is connected to pipe 52 and air is thereby supplied to the differential accelerator operating engine 53.

Figure 16:
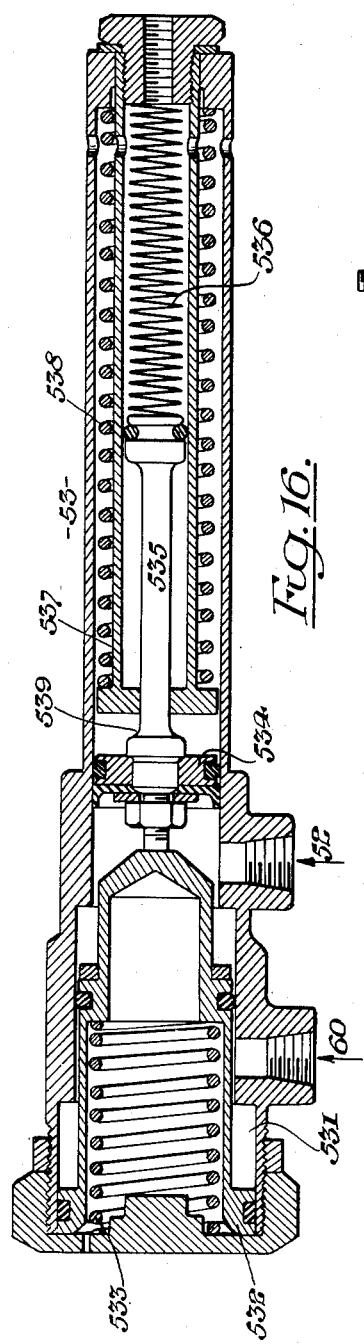
Figure 16 is a longitudinal central cross sectional view through the differential engine employed to actuate the accelerator.
Figure 17:
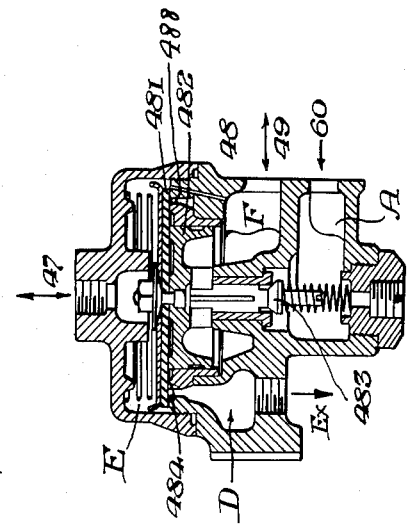
Figure 17 is a vertical central cross sectional view through a relay valve used in the winch clutch actuating system.

Engine 53 is shown in detail in Figure 16. The space 531 behind the larger piston 532 is continuously supplied with air under tank pressure by line 60, holding piston 532 in the position shown and spring 533 compressed. When air is supplied behind the smaller piston 534 from line 52, the effect of the pressure on the larger piston 532 is balanced to that degree where compressed spring 533 may shift the piston 532 to the right, carrying piston plunger 535 with it. Piston plunger 535 continues to move to the right until the shoulder 539 thereon engages the end of sleeve 537 whereupon it begins to move to the right. However, the piston assembly does not jump to this position in that shoulder 539 is brought into engagement with the sleeve 537 under the gradually increasing resistance afforded by the spring 536 and the movement of sleeve 537 is further cushioned by the increasing resistance built up as spring 538 is compressed.

Thus, the assembly of which the springs 536 and 538 are a part serves to cushion the initial movement of the sleeve 537 and hence, of the actuating leverage system through which the piston 534 is accelerated by the movement of sleeve 537. Hence, it will be seen that the control of the carburetor 14 can be smooth and gradual because of the construction of the engine 53 and the fact that valve 27 is a throttling valve. When the plunger of the throttling valve 27 is released, pipe 51 is disconnected from pipe 52 and the air behind small piston 534 and in the line 52 is exhausted through the throttling valve by reason of the fact that after valve 274 seats valve 275 unseats and exhaust is effected through the passage 276 and the exhaust port of the valve. Spring 272 serves to cushion the transmission of force from plunger 271 to the piston assembly 273, further contributing to smooth operation of this portion of the mechanism.

When lever 16 has been moved to the position to open microswitch 28' the spring pressed ball detent 18a engages the depression 18" in the cam 16' forming part of lever 16. In this position the low and high clutches 50a and 58a are disengaged as previously described. Further movement of lever 16 in the same direction will provide the accelerated control previously described and thus a spring pressed ball detent 18a provides the operator with an indicator of the relative position of lever 16 with respect to these various conditions of operation.

In quite a similar manner the high clutch motor 58 can be actuated by rotating lever 16 and the fixture 18 in the bearing 19 in a direction away from the operator, that is, in a counterclockwise direction, Figure 4, to actuate valve 24. The actuation of valve 24 will quite similarly supply air from tank 45 through line 54, valve 24 and line 55 to energize the relay 56 which in turn will connect line 60 with line 57 to operate the motor 58 and engage the high clutch 58a. This high clutch will be disengaged by closing switch 28' to energize the magnet valve 59 all as previously described.

Figure 21:
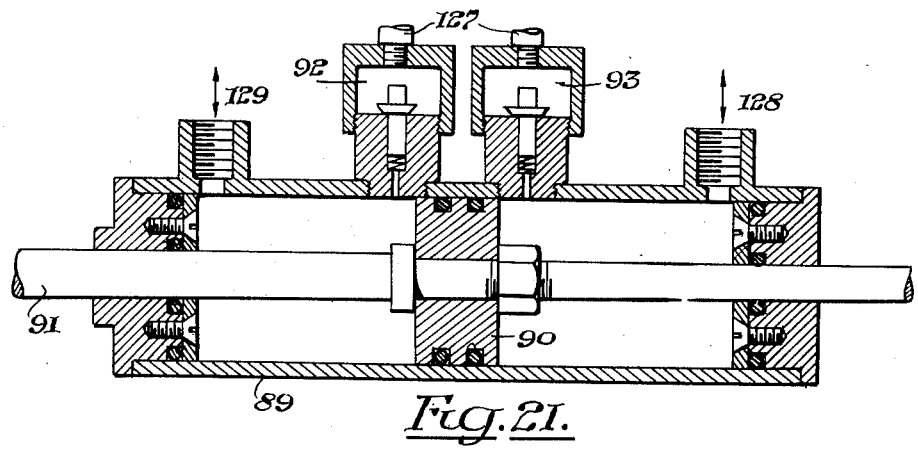
Figure 21 is a longitudinal vertical central cross sectional view through one of the gear shift actuators for the system of Figure 19.

A description of the mechanism and controls therefor by means of which the engine clutch EC is engaged and disengaged and the gears of the transmission are shifted will now be given in connection with the preferred form of the invention as illustrated in Figure 19. The gear box is diagrammatically illustrated at 100 and for the purposes of this disclosure it will be assumed that the gear system includes a reverse and five forward speeds. The gears are shifted by the movements of piston rods 91, 95 and 99, each of which forms a part of the fluid pressure engines 89, 94 and 98, respectively, of which the engine 89 is shown in detail in Figure 21. Engine 89 consists of a cylinder closed at the ends and through which the piston rod 91 extends at both ends and which piston rod is provided with a piston 90. When the gears controlled by this engine are disengaged the piston 90 is in the center of the cylinder as shown in Figure 21. On each side of this center position are a pair of valves 92 and 93, spring biased to open position. The manner in which the piston rod 91 actually affects gear shift forms no part of this invention as there are various well known forms of mechanism capable of actuation in this way to effect meshing and unmeshing of the gears.

The other ends of the piston rods 91, 95 and 99 are provided with collars or cams for actuating switches 134 and 145, 141 and 143, and 137 and 139, respectively, depending upon their direction of movement. As indicated in Figure 19, switch 134 is associated with first gear position, switch 145 is associated with reverse gear position, switch 141 with fourth gear position, switch 143 with fifth gear position, switch 137 with second gear position and switch 139 with third gear position. Thus, as suggested, the piston rods may move in either direction from their normal centered position shown in Figure 19. One terminal of each of these switches is grounded as indicated and a current source 136 for these switches is also grounded. The other contact of each of these switches is connected through a signal light to the other terminal of the current source. Thus, switch 134 is connected to a signal lamp 135, 145 to 146, 141 to 142, 143 to 144, 137 to 138 and 139 to 140. Obviously, as each of these switches is selectively closed, the lamp connected thereto is energized to notify the operator in which of the several gears the transmission is operating. Referring to Figure 2, it will be found that each of these signal lamps appears on the operator's control box panel.

At 15 is diagrammatically illustrated a pneumatic motor for operating the engine clutch EC by means of the linkage system 116 and the shaft 115. The engine 15 can be in construction quite like the brake engine of Figure 10 where the plunger 734 would be connected to the linkage system 116. Pressure fluid is supplied to engine 15 by means of the branch line 113 from the main pressure line 60 of Figure 7. Connected in the line 113 is a magnet valve 110 which may be exactly like that illustrated in Figure 12. The supply line 114 from the valve connects with the intake port of the engine 15. When magnet valve 110 is deenergized the engine in line 114 is open to exhaust. Magnet valve 110 is energized from a grounded current source 122 through the motor clutch switch 121. It will be recalled that switch 41 is a main power switch and is on the control box 12. Upon each energization of valve 110 engine 15 is actuated to engage the clutch EC.

The gear shift motors are connected into a fluid pressure controlled system which, as illustrated, employs a liquid for actuation. At 111 is diagrammatically illustrated a power driven pump for delivering the operating liquid from the storage reservoir 112 to the supply line 126 to which is connected by branch lines a series of magnet valves 103 to 109, inclusive. The exhaust ports of each of these magnet valves are connected by branch lines to a main return line 147 which discharges back into the tank 112. From each magnet valve 103 to 109, inclusive there extends the fluid supply lines 133 to 127, respectively, which supply lines are connected to various intake ports on the engines 89, 94 and 98 and which lines also provide exhaust conduits for these engines with the exception that the supply and exhaust line 127 is connected in parallel to the check valves 92 and 93 and 96 and 97 and 101 and 102 of these engines. Each of the magnet valves 103 to 109, inclusive, are also like the magnet valve illustrated in Figure 12.

One terminal of each of the windings of the magnet valves 103 to 109 is grounded. At 117, 118, 119 and 120 are the single-pole double-throw switches, the movable contact of each of which is connected by a common lead to the ungrounded terminal of the current source 122. The fixed contacts of switch 117 are connected, respectively, to the other terminals of the windings of each of the valves 103 and 104. Similarly, the fixed contacts of switches 118 and 119 are connected, respectively, to the other terminals of the windings of valves 105 and 106 and 107 and 108.

At 124, 123 and 36 are three polarized electromagnetic operated relays each having one contact terminal connected by a common lead to the ungrounded terminal of the current source 122. The other contact of each relay is grounded through the particular device which it operates. One actuating terminal of relays 123 and 124 is connected to the fixed contact CG of switch 120 and one actuating terminal of relay 36 is connected to the other fixed contact CN of this switch. The other actuating terminal of relays 123, 124 and 36 are grounded as shown. The circuit controlled by relay 124 includes the grounded starting relay 125 for the motor operated pump 111. When the starter relay 125 is energized the grounded current source is connected to the pump motor to energize it. The relays 124, 123 and 36 are preferably of the polarized type in order that, for example, when the circuit to the starter relay 125 is energized the current cannot effect undesired operation of relays 124 and 123.

When switch 120 is operated to engage the contact CG, both the relays 123 and 124 are energized. Energization of relay 124 energizes the starter relay 125 to start the motor driven pump 111. Energization of relay 123 operates magnet valve 109 to supply fluid under pressure from line 126 to line 127 into the chambers which contain all of the check valves 92, 93, 96, 97, 101 and 102, causing them all to close simultaneously, see Figure 21.

In order to operate any particular one of the engines 89, 94 and 98, switches 117, 118 and 119 are selectively operated. Naturally, the first gear in picking up a load will first be engaged and therefore switch 119 will be closed on its contact 1. It will be understood of course that motor 15 is energized as previously described so that the engine clutch EC is disengaged. The closing of switch 119 on contact 1 energizes valve 108 to supply fluid through line 128 to the righthand side of engine 89 causing its piston 90 to shift its piston rod 91 to the left, Figure 19, engaging the so-called first gears and at the same time closing switch 134 to energize signal light 135. Switch 121 is then opened, deenergizing motor 15 and engaging the engine clutch EC. Power is then delivered from the engine ME up to the winch clutches operated by the motors 59 and 58 as previously described so that upon proper actuation of lever 16 the winch drum WD can be set into operation at the lowest speed by motor 59 or an alternative higher speed by the motor 58 depending upon load conditions on the tubing string. Switch 120 need only remain engaged with contact CG until the first gear is engaged because the gears will remain engaged upon operation. As soon as switch 120 is opened the fluid pressure is relieved in the check valve chambers. In order to remove the transmission from first gear the operator must first disengage the engine clutch EC by activating motor 15 as explained above. The operator then closes switch 119 on contact R energizing magnet valve 107 and supplying fluid under pressure through line 129 to the lefthand side of engine 89 shifting the piston and connected parts back to centered position as shown in Figure 21, which centered position results from the fact that check valves 92 and 93 are now open so that as soon as the piston passes the intake port for valve 92 fluid may flow out through line 127 and back to main supply line 147, valve 109 being deenergized. As a result, the piston stops in approximately centered position and as a result of this movement the first gear is disengaged. From the above description those skilled in the art can readily trace through the operations to effect the progressive engagement of the gears through first gear to fifth gear as well as reverse gear, it being emphasized as would naturally be expected that the engine clutch EC is disengaged during the engagement and disengagement of the gears. For emphasis attention is again directed to the fact that for all positions of the gears in the gear box 100 and the actuating mechanism therefor there is a signal light to indicate gear conditions at all times.

A careful study of the disclosure in Figure 19 will show that whenever the operator wishes to mesh the gears 100 switch 120 is closed on contact CG but when the operator wishes to unmesh the gears 100 switch 120 is placed on contact CN. In either position of switch 120 motor driven pump 111 operates but in the CG position in addition valve 109 is operated to close all the check valves 92, 93, 96, 97, 101 and 102 and operation must precede the individual actuation of switches 117, 118 or 119 to effect various gear engagements. However, when effecting gear disengagements, valve 109 should be in deenergized position and motor driven pump 111 must be operating so that switch 120 is closed on CN.

Figure 22:
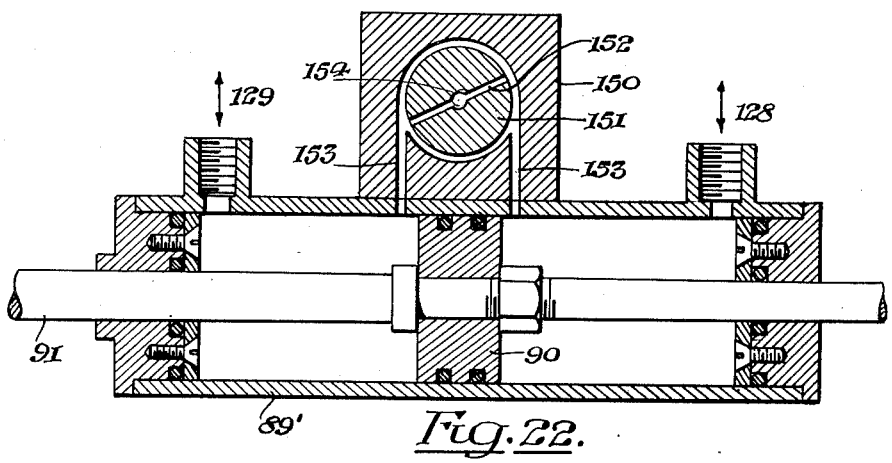
Figure 22 is a longitudinal vertical central cross sectional view through one of the gear shift actuators for the system of Figure 20.
Figure 23:
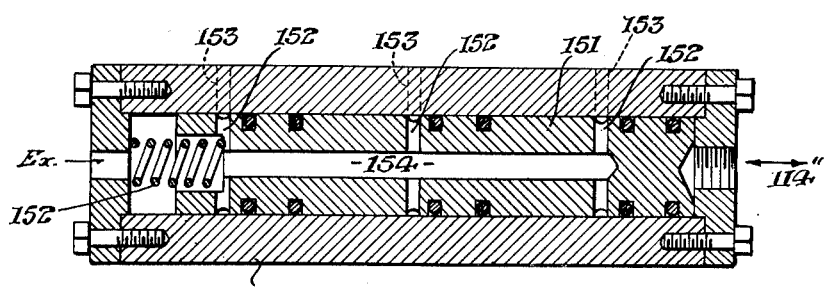
Figure 23 is a longitudinal vertical central cross sectional view through the control valve for the actuators of Figure 20.

The system of Figure 20 will now be described, it being noted that it comprises a modified construction for effecting engagement and disengagement of the gears 100 by a different apparatus combination, in this case actuated by air pressure supplied through the branch 113 connected as shown in Figure 7 to the main air supply line 60. In view of the fact that air in this case is employed, it is possible to exhaust it directly to atmosphere so that the piping system for the gear actuating motors 89', 94' and 98' is thereby simplified. The gear actuating motors in this case are modified so as to have the form shown in Figures 22 and 23. The signal lamps for indicating the various gear positions are exactly the same as in the case of Figure 19 and no further reference will therefore be made to them in describing the system of Figure 20. The piping system and wiring circuits are insofar as they are common to the two figures are so similar that a detailed catalogue of the parts in addition to the description of Figure 20 seems unnecessary. One distinguishing feature of Figure 20 is that the actuation of switch 120 accomplishes the same functions as were effected by the operation of switches 120 and 121 in Figure 19.

In order, for example, to engage the first gear, the operator first closes switch 120 on contact CG energizing magnet valve 109 so that air is supplied from line 113 through that valve to line 127 and thence by line 114" to the selector valve 150. Air is also supplied from 127 to the check valve 156 through 114" and thence through 114' to motor 15. The piston of the check valve moves to the upper position diagrammatically illustrated in Figure 20 so that air may flow through the branch 114' to actuate the clutch motor 15 to disengage the engine clutch EC. The air supplied to the selector valve 150 shifts the valve plug 151, see Figure 23, to the left, compressing spring 152, and moving the peripheral ports 152 out of alignment with the cooperating fixed passages 153 in the valve body. Then, in order to engage gears 100 in first gear the operator actuates switch 119 on the contact 1 thereby energizing magnet valve 108 so that air is supplied from line 113 through branch 128 into the righthand end of air engine 89'. The piston 90 of this engine shifts the piston rod 91 to the left and engages first gear. Switch 119 can then be opened because it will be recalled that the gears when engaged, remain engaged, that is, they require an active force to disengage them. The operator then opens switch 120 deenergizing magnet valve 109 so that air is exhausted from the selector valve 150 and motor 15 through line 114', check valve 156, line 114" and branch 127. The piston of the check valve 156 during this operation may shift to lower position but any air remaining in the motor 73 and line 114' may then exhaust to atmosphere through line 114, magnet valve 110 being deenergized. Exhausting air from selector valve 150 permits spring 152, Figure 23, to shift the valve plug 151 back to the position shown in that figure so that each pair of ports 153 is aligned with the peripheral passages 152 so that when the engaged gear is disengaged piston 90 will return to approximately centered position by reason of the fact that the lefthand side of the cylinder of the engine can exhaust into the righthand side when the piston approaches approximately centered position in a manner quite similar to the operation of the structure of Figure 21. It will be quite apparent how, by the proper operation of switches 117, 118 and 119, the various gear ratios may be rendered operative and inoperative.

It will now be clear how as previously suggested the operator may use the power operated gear actuated engines to effect normal gear shifts in moving the vehicle about by the simple expedient of providing a second set of switches corresponding to the set of switches 117, 118, 119, 120 and 121 in the case of Figure 19 in parallel therewith and switches 117, 118, 119 and 120 in parallel therewith in the case of Figure 20. These additional paralleled switches would preferably be mounted on the dashboard of the vehicle so that the vehicle could be operated by the same power gear shifting mechanism employed in well pulling operations, saving the operator the fatigue of manual gear shifting.

Any suitable source of current for the systems described can be used such as the battery shown at 122 or any other current source which can be connected to the wire 148 of Figure 19.

In retrospect, it will be seen that in addition to describing in detail every individual element employed in the systems herein disclosed, there has been provided a detailed description of all of the operation of which the systems are capable. In view of that description those skilled in the art will now understand how an operator may transport an installation comprising the invention to any well site as the entire mechanism of the system is installed on a mobile vehicle and is completely self-contained. Upon the arrival of the vehicle at a well site the operator may place it and the control box 12 with respect to the well and each other so as to afford him the most desirable and safe operating conductions. As previously suggested, it is apparent that without invention the subject matter herein disclosed may be applied to a mast type of pulling unit as well as to the derrick type as herein disclosed.

The operator has at a single control position, namely, the control box 12, conveniently arranged all of the controls necessary to effect the full operation of the system of which it is capable to attain all of the advantages and utility thereof. He may accomplish these things with a view to his own personal convenience so that he may perform his job with a minimum of physical fatigue and thereby with a maximum efficiency.

It will be understood that he may control the engine which is the primary source of power for all of the operations from the control station. It is desirable to point out here that this invention contemplates the use of a source of power either separate from the engine of the vehicle or as a supplement thereto when conditions indicate this to be desirable without loss of any of the advantages of the system. He may effect the pulling and running of the well tubing under the most efficient conditions and at the highest speeds as experience indicates. Under heavy load conditions he can condition the apparatus to supply the necessary pulling forces and as the load modifies he can, with equal facility, speed up operations to attain the ultimate object of pulling and running the tubing in the shortest period possible. He at all times can tell by visual and audible indications the condition of the various mechanism under his control, thereby preventing the creation of faults or dangerous conditions.

It will of course be appreciated that often there are employed additional appurtenances to the efficient operation of systems of this kind which are adapted to remote control and that the control devices therefor can also be mounted on the control panel of the box 12. For example, it is common practice to employ power operated tongs for breaking and making the joints in pulling and running the tubing and these tongs are adapted to control from a remote point which could be the control box 12 so that all of the powered operations of pulling and running a tubing string could be under the control and at the responsibility of a single operator, thereby minimizing hazardous operations.

In view of the scope of the subject matter herein disclosed it will be apparent at once to those skilled in the art that the details of the systems comprising this invention and the various individual elements employed are capable of considerable variation and I do not therefore desire to be strictly limited to the illustrative embodiments of my invention herein disclosed. I prefer that the scope of my invention be determined by the claims granted me.

What is claimed is:

1. A mobile well servicing unit comprising, in combination, a vehicle chassis, an engine for driving said vehicle, a winch drum mounted on said chassis, a transmission for operating said drum from said engine including a low speed and a high speed winch drum clutch, motive means for actuating said clutches, winch drum brake actuating means, a motive device for operating said brake actuating means, and a portable control unit for remotely controlling the selective operation of said means for actuating said clutches to cause operation of said winch drum at different speeds and for operating the motive device for said brake actuating means, whereby the control unit may be placed at any desired location with respect to said vehicle and a work point.

2. In the combination of claim 1, said engine being an internal combustion engine, means for controlling the rate of fuel supply to said engine, means forming part of said control unit for concontrolling said fuel supply means, said clutch of said engine.

3. In the combination of claim 1, said clutch motors being pressure fluid operated to engage and disengage said drum clutches.

4. In the combination of claim 1, said engine being an internal combustion engine, means on said control unit for controlling the rate of fuel supply to said engine, and pressure fluid operated means actuable from said control unit for controlling said fuel supply means, said clutch motors and said brake actuating motive device being of the pressure fluid operated type.

5. In the combination of claim 1, said control unit including a manual positionable in either of several positions to effect selective pressure fluid operation of said clutch motors in either of two directions.

6. In the combination of claim 1, said engine being an internal combustion engine, and power operated means for controlling the rate of fuel supply to said engine, said control unit including a manual pivotally mounted for rotation on two separate axes, rotation about one axis effecting selective control of said clutch motors and rotation about the other effecting operation of said power operated fuel supply means.

7. In the combination of claim 1, said control unit including an oscillatable manual to effect selective control of said clutch motors in either of two directions and a second manual for effecting graduated control of said brake actuating motive device.

8. In the combination of claim 1, said engine being an internal combustion engine, means for controlling the rate of fuel supply to said engine, means forming part of said control unit for controlling said fuel supply means to vary the speed of said engine, and means on said control unit for indicating engine speed.

9. In the combination of claim 1, said remotely actuable means comprising a manual pivoted for movement in opposite directions on each of two axes to effect said selective control.

10. In the combination of claim 1, a carburetor for said engine, said remotely actuable means including a manual operable in a plurality of directions for controlling said carburetor on movement of said manual in one of said directions.

11. In the combination of claim 1, said remotely actuable means including a manual movable in opposite directions on each of two intersecting axes, movement in one direction on one of said axes effecting disengagement of both of said winch clutches.

12. In the combination of claim 1, a multi-positionable manual on said control unit and means actuated by said manual to selectively energize said clutch actuating motive means to individually engage said clutches upon movement of said manual to either of two positions and upon return to initial position to energize whichever of said motive means was previously energized to disengage the associated clutch.

13. In the combination of claim 1, a source of energy for said motive device and means connected to said source and operated by a drop in the energy level thereof for independently energizing said brake operating motive device for automatically applying the brakes.

14. A well servicing system comprising, in combination, an engine, a winch drum, a transmission for operating said drum from said engine including a multi-speed gear train, an engine clutch, low speed and high speed winch drum clutches, motors for actuating said clutches, winch drum brake actuating means, a motive device for actuating said brake actuating means, and a remotely positionable control unit for effecting selective operation of said gear train and said clutch motors to cause operation of said winch drum at various speeds and the operation of said brake actuating motive device.

15. In the combination of claim 14, said clutch and brake motors being of the pressure fluid operated type, and said control unit including a two position manual for effecting selective operation of said clutch motors.

16. In the combination of claim 14, said clutch and brake motors being of the pressure fluid operated type, said control unit including a two position manual for effecting selective operation of said clutch motors, and a second manual at said control unit for effecting operation of said brake actuating motive device.

17. In the combination of claim 14, said engine being an internal combustion engine, power operated means for controlling the rate of fuel supply to said engine and means forming part of said control unit for controlling said power operated fuel supply means.

18. In the combination of claim 14, said engine being an internal combustion engine, power operated means for controlling the rate of fuel supply to said engine and means forming part of said control unit for controlling said power operated fuel supply means comprising a manual operable in one plane for controlling said power operated fuel supply means and operable in another plane to effect selective operation of said clutch motors.

19. In the combination of claim 14, said engine being an internal combustion engine, power operated means for controlling the rate of fuel supply to said engine, means forming part of said control unit for controlling said power operated fuel supply means, and means at said control unit for indicating the engine speed.

20. In the combination of claim 14, said engine being an internal combustion engine, power operated means for controlling the rate of fuel supply to said engine, means forming part of said control unit for controlling said power operated fuel supply means, means at said control unit for indicating the engine speed, and means forming part of said control unit for indicating the condition of the gear train.

21. In the combination of claim 14, said remotely positionable control unit including a lever movable in opposite directions on each of two axes for effecting said selective operation.

22. In the combination of claim 14, a carburetor for said engine, said remotely positionable control unit including a manual movable in opposite directions of each of two axes, actuation of said manual in one direction on one axis controlling said carburetor.

23. A well servicing system comprising, in combination, an internal combustion engine, power operated means for controlling the rate of fuel supply to said engine, a winch drum, a transmission for operating said drum from said engine including a low speed and a high speed clutch, motive means for actuating said clutches, a winch drum brake actuating means, a motive device for operating said brake actuating means and a remotely actuable manual mounted for rotation in opposite directions upon two axes, rotation of said manual on one axis effecting selective control of said motive means for said clutches and rotation on the other of said axes for controlling said power actuated fuel supply means.

24. In the combination of claim 23, a second manual for effecting control of said motive device for operating said brake actuating means.

25. In the combination of claim 23, means at said remotely actuable means for indicating the speed of said engine.

26. In the combination of claim 23, means at said remotely actuable means for indicating the speed of said engine, and gear position indicating means at said remote control point.

27. A mobile well servicing unit, comprising in combination a vehicle chassis, an engine for driving said chassis, a winch drum mounted on said chassis, a transmission for operating said drum from said engine including a winch drum clutch, a winch drum brake, a pressure fluid motor for operating said brake, a portable control unit placeable at any desired location with respect to said vehicle, flexible control connections between said unit and said motors, and a positionable control manual on said unit operable to selectively actuate said motors to gradually engage said clutch and brake.

28. In the combination of claim 27, a source of pressure fluid, and a pair of relay valves in said unit controlled by said manual, said control connections including connections between said source, said valves and said motors.

29. In the combination of claim 27, a source of pressure fluid for said motors, and means connected to said source and actuable upon an excess of drop in pressure of said source for independently energizing said brake motor to automatically apply the brake.

30. A mobile well servicing unit, comprising in combination a vehicle chassis, an engine for driving said chassis, a winch drum mounted on said chassis, a winch drum clutch, a transmission for operating said drum from said engine including a power operated clutch and gear shift mechanism, a pressure fluid motor for operating said winch drum clutch, a portable control unit placeable at any desired location with respect to said vehicle, flexible control connections between said unit and said motor and power operated clutch and gear shift mechanism, and a control manual on said control unit operable to selectively actuate said motor and power operated clutch and gear shift mechanism.

31. In the combination of claim 30, a motive device for operating said gear shift mechanism and means on said control unit for controlling the energization and deenergization of said last motive device.

JOHN H. PROVINCE.

References Cited in the file of this patent

UNITED STATES PATENTS

| Number | Name | Date |
|---|---|---|
| 790,765 | Turner | May 23, 1905 |
| 1,091,160 | Phillips | Mar. 24, 1914 |
| 1,491,077 | Beerworth | Apr. 22, 1924 |
| 1,492,419 | Brackett | Apr. 29, 1924 |
| 1,878,282 | Macaulay | Sept. 20, 1932 |
| 2,009,889 | Hild | July 30, 1935 |
| 2,165,350 | Davidson et al. | July 11, 1939 |
| 2,168,667 | Dausch | Aug. 8, 1939 |
| 2,177,213 | Gleasman | Oct. 24, 1939 |
| 2,187,623 | Maier | Jan. 16, 1940 |
| 2,243,642 | Muir et al. | May 27, 1941 |
| 2,264,569 | Holmes | Dec. 2, 1941 |
| 2,297,715 | Nordstrom | Oct. 6, 1942 |
| 2,345,224 | Upp | Mar. 28, 1944 |
| 2,445,781 | Hrdlicka | July 27, 1948 |
| 2,464,986 | Miller | Mar. 22, 1949 |
| 2,505,260 | Stevens | Apr. 25, 1950 |